United States Patent
Komatsu

(10) Patent No.: US 8,176,735 B2
(45) Date of Patent: May 15, 2012

(54) CONTROL DEVICE FOR MULTI-STAGE TURBOCHARGERS

(75) Inventor: Akira Komatsu, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 459 days.

(21) Appl. No.: 12/440,612

(22) PCT Filed: Sep. 7, 2007

(86) PCT No.: PCT/JP2007/067485
§ 371 (c)(1),
(2), (4) Date: Mar. 10, 2009

(87) PCT Pub. No.: WO2008/032649
PCT Pub. Date: Mar. 20, 2008

(65) Prior Publication Data
US 2010/0011763 A1    Jan. 21, 2010

(30) Foreign Application Priority Data
Sep. 11, 2006  (JP) .................................. 2006-245401

(51) Int. Cl.
*F02B 37/013*  (2006.01)
*F02B 37/00*  (2006.01)
*F02B 37/12*  (2006.01)

(52) U.S. Cl. .......... 60/605.1; 60/602; 415/146; 417/28; 123/562

(58) Field of Classification Search .............. 60/602, 60/605.1, 612; 123/41.11, 90.11, 562; 415/146; 417/28; 477/43; *F02B 37/00, 37/12, 37/13*
See application file for complete search history.

(56) References Cited

U.S. PATENT DOCUMENTS

| | | | | |
|---|---|---|---|---|
| 3,257,797 A * | 6/1966 | Lieberherr | ...................... | 60/599 |
| 4,292,806 A * | 10/1981 | Moore et al. | .................... | 60/600 |
| 4,292,807 A * | 10/1981 | Rannenberg | ..................... | 60/601 |
| 5,105,624 A * | 4/1992 | Kawamura | ....................... | 60/608 |
| 6,314,733 B1 * | 11/2001 | Fallahi et al. | .................. | 60/598 |
| 6,962,140 B1 * | 11/2005 | Nakai et al. | ................... | 123/436 |

(Continued)

FOREIGN PATENT DOCUMENTS

JP    2002-317703    10/2002

(Continued)

OTHER PUBLICATIONS

English translation, Itabashi et al (JP 2005-330811, IDS), 2005.*
International Search Report for PCT/JP2007/067485 dated Oct. 9, 2007.

*Primary Examiner* — John K Kim
(74) *Attorney, Agent, or Firm* — McCormick, Paulding & Huber LLP

(57) ABSTRACT

A control device for multi-stage turbochargers is provided that is capable of improving fuel consumption in transient and stationary states of an engine equipped with multi-stage turbochargers. A control device 1 for multi-stage turbochargers which are turbochargers 6, 7 of at least two or more stages provided in series at an engine 2 and in which the high-pressure stage turbocharger 6 is configured by a variable-capacity turbocharger 6 equipped with a variable vane 64 comprising detection means 11, 12 for detecting a boost pressure or an intake air amount of a turbocharger 7 of a stage with a pressure lower than that of the variable-capacity turbocharger 6, the opening degree of the variable vane 64 being controlled on the basis of a detection value of the detection means 11, 12.

1 Claim, 4 Drawing Sheets

U.S. PATENT DOCUMENTS

| | | | |
|---|---|---|---|
| 7,937,996 B2 * | 5/2011 | He et al. | 73/114.77 |
| 2002/0173898 A1 * | 11/2002 | Itoyama et al. | 701/104 |
| 2006/0053788 A1 * | 3/2006 | Furman et al. | 60/608 |
| 2010/0011763 A1 * | 1/2010 | Komatsu | 60/602 |

FOREIGN PATENT DOCUMENTS

| | | |
|---|---|---|
| JP | 2004-225586 | 8/2004 |
| JP | 2005-315163 | 11/2005 |
| JP | 2005-330811 | 12/2005 |

* cited by examiner

Smoke AVL-439  SAMPLING INTERVAL 0.1sec

CONTROL DEVICE FOR MULTI-STAGE TURBOCHARGERS

CROSS REFERENCE TO RELATED APPLICATIONS

This application is entitled to the benefit of and incorporates by reference essential subject matter disclosed in International Patent Application No. PCT/JP2007/067485 filed on Sep. 7, 2007 and Japanese Patent Application No. 2006-245401 filed Sep. 11, 2006.

TECHNICAL FIELD

The present invention relates to a control device for multi-stage turbochargers in which turbochargers of at least two stages are provided in series.

BACKGROUND

In recent years, exhaust gas standards for automobile engines have been getting more stringent from year to year, methods for engine evaluation have also been getting more demanding, and methods for performing evaluation during start and acceleration have been introduced. As specific evaluation methods, a JE05 mode has been implemented in Japan and an ETC mode has been implemented in Europe (EC).

Exhaust gas standards widely use nitrogen oxide (referred to hereinbelow as NOx) and diesel particulate (referred to hereinbelow as PM) values, but because of a trade-off relationship therebetween, it is extremely difficult to decrease both.

Presently, effective means for meeting the exhaust gas standards include the decrease in amount of NOx by a high exhaust gas recirculation (referred to hereinbelow as EGR) and the decrease in PM by ensuring a high lambda (extra intake coefficient λ). To meet both requirements, it is necessary to use a system that ensures a high lambda over the entire engine range (entire operation range), that is, a system that can supply high overcharge to the engine.

FIG. 3 illustrates a transient (JE05 mode) operation mode adapted in Japan and test data. Time (sec) is plotted against the abscissa, and smoke-lambda-engine revolution speed are plotted in the order of description from below on the ordinate.

As shown in FIG. 3, where a vehicle is started from an engine idle state, that is, from a state in which the vehicle has been stopped, the engine revolution speed rises rapidly when the vehicle is started. At this time, the amount of intake air is temporarily insufficient and lambda rapidly drops close to 1. As a result, a large amount of smoke is discharged.

A two-stage turbo system can be considered as a system capable of supplying high supercharge to an engine with the object of satisfying the above-described exhaust gas standards.

A two-stage turbo system is basically a system in which by disposing two turbochargers for an engine, it is possible to realize a supercharge that is higher than that in the conventional single turbo engine over the entire engine operation range.

In such two-stage turbo system, a high supercharge is realized by performing two-stage supercharging with two turbochargers (see Patent Documents 1 and 2).

Patent Document 1: Japanese Patent Application Laid-open No. 2004-225586.
Patent Document 2: Japanese Patent Application Laid-open No. 2005-315163.

DISCLOSURE OF THE INVENTION

However, the problem associated with the two-stage turbo system is that a pressure increase lag occurs in a turbocharger disposed in a low-pressure stage (rear stage) in a rise period e.g. in a transient test mode.

FIG. 4 shows comparison results on a turbo pressure (boost pressure) rise of a single-turbo system and a two-stage turbo system in a transient period.

Thus, a boost that was naturally and sufficiently obtained in engine stationary operation cannot be sufficiently attained in a transient mode.

For example, where settings with the best NOx-PM (SM) and fuel consumption are found in advance in a stationary test, a performance map such as that of Table 1 is produced, and a transient performance test is performed using the performance map such as that of Table 1, a turbo lag occurs in the transient test and NOx-PM cannot reach the target value.

Accordingly, in the transient mode, in order to match the target exhaust gas value, a variable vane (VGT) of the turbo disposed in the first stage (high-pressure stage) can be controlled with a map (see Table 2) in which an opening degree is further reduced with respect to that of the map (see Table 1) obtained in the stationary test.

TABLE 1

| TRB TRG | 500 | 600 | 700 | 800 | 900 | 1000 | 1100 | 1200 | 1300 | 1400 | 1500 | 1600 | 1700 | 1800 | 1900 | 2000 |
|---|---|---|---|---|---|---|---|---|---|---|---|---|---|---|---|---|
| 0 | 10 | 10 | 15 | 20 | 25 | 30 | 33.75 | 37.5 | 41.25 | 45 | 50 | 55 | 62.5 | 70 | 80 | 90 |
| 20 | 10 | 10 | 15 | 20 | 25 | 30 | 33.75 | 37.5 | 41.25 | 45 | 50 | 55 | 62.5 | 70 | 80 | 90 |
| 40 | 10 | 10 | 15 | 20 | 25 | 30 | 33.75 | 37.5 | 41.25 | 45 | 50 | 55 | 62.5 | 70 | 80 | 90 |
| 60 | 10 | 10 | 15 | 20 | 25 | 30 | 33.75 | 37.5 | 41.25 | 45 | 50 | 55 | 62.5 | 70 | 80 | 90 |
| 80 | 10 | 10 | 15 | 20 | 25 | 30 | 33.75 | 37.5 | 41.25 | 45 | 50 | 55 | 62.5 | 70 | 80 | 90 |
| 100 | 10 | 10 | 15 | 20 | 25 | 30 | 33.75 | 37.5 | 41.25 | 45 | 50 | 55 | 62.5 | 70 | 80 | 90 |
| 120 | 10 | 10 | 15 | 20 | 25 | 30 | 33.75 | 37.5 | 41.25 | 45 | 50 | 55 | 62.5 | 70 | 80 | 90 |
| 140 | 10 | 10 | 15 | 20 | 25 | 30 | 33.75 | 37.5 | 41.25 | 45 | 50 | 55 | 62.5 | 70 | 80 | 90 |
| 160 | 10 | 10 | 15 | 20 | 25 | 30 | 33.75 | 37.5 | 41.25 | 45 | 50 | 55 | 62.5 | 70 | 80 | 90 |
| 180 | 10 | 10 | 15 | 20 | 25 | 30 | 33.75 | 37.5 | 41.25 | 45 | 56.25 | 62.5 | 68.5 | 75 | 82.5 | 90 |
| 200 | 10 | 10 | 15 | 20 | 25 | 30 | 33.75 | 37.5 | 47.5 | 55 | 62.5 | 70 | 75 | 80 | 85 | 90 |
| 220 | 10 | 10 | 15 | 20 | 25 | 30 | 33.75 | 37.5 | 47.5 | 55 | 62.5 | 70 | 75 | 80 | 85 | 90 |
| 240 | 10 | 10 | 15 | 20 | 25 | 30 | 33.75 | 37.5 | 47.5 | 55 | 62.5 | 70 | 75 | 80 | 85 | 90 |
| 260 | 10 | 10 | 15 | 20 | 25 | 30 | 33.75 | 37.5 | 47.5 | 55 | 62.5 | 70 | 75 | 80 | 85 | 90 |
| 310 | 10 | 10 | 15 | 20 | 25 | 30 | 33.75 | 37.5 | 47.5 | 55 | 62.5 | 70 | 75 | 80 | 85 | 90 |

TABLE 2

| TRB TRG | 500 | 600 | 700 | 800 | 900 | 1000 | 1100 | 1200 | 1300 | 1400 | 1500 | 1600 | 1700 | 1800 | 1900 | 2000 |
|---|---|---|---|---|---|---|---|---|---|---|---|---|---|---|---|---|
| 0 | 7 | 7 | 10.5 | 14 | 17.5 | 21 | 23.625 | 26.25 | 28.875 | 31.5 | 39.375 | 38.5 | 43.75 | 49 | 56 | 63 |
| 20 | 7 | 7 | 10.5 | 14 | 17.5 | 21 | 23.625 | 26.25 | 28.875 | 31.5 | 39.375 | 38.5 | 43.75 | 49 | 56 | 63 |
| 40 | 7 | 7 | 10.5 | 14 | 17.5 | 21 | 23.625 | 26.25 | 28.875 | 31.5 | 39.375 | 38.5 | 43.75 | 49 | 56 | 63 |
| 60 | 7 | 7 | 10.5 | 14 | 17.5 | 21 | 23.625 | 26.25 | 28.875 | 31.5 | 39.375 | 38.5 | 43.75 | 49 | 56 | 63 |
| 80 | 7 | 7 | 10.5 | 14 | 17.5 | 21 | 23.625 | 26.25 | 28.875 | 31.5 | 39.375 | 38.5 | 43.75 | 49 | 56 | 63 |
| 100 | 7 | 7 | 10.5 | 14 | 17.5 | 21 | 23.625 | 26.25 | 28.875 | 31.5 | 39.375 | 38.5 | 43.75 | 49 | 56 | 63 |
| 120 | 7 | 7 | 10.5 | 14 | 17.5 | 21 | 23.625 | 26.25 | 28.875 | 31.5 | 39.375 | 38.5 | 43.75 | 49 | 56 | 63 |
| 140 | 7 | 7 | 10.5 | 14 | 17.5 | 21 | 23.625 | 26.25 | 28.875 | 31.5 | 39.375 | 38.5 | 43.75 | 49 | 56 | 63 |
| 160 | 7 | 7 | 10.5 | 14 | 17.5 | 21 | 23.625 | 26.25 | 28.875 | 31.5 | 39.375 | 38.5 | 43.75 | 49 | 56 | 63 |
| 180 | 7 | 7 | 10.5 | 14 | 17.5 | 21 | 23.625 | 26.25 | 28.875 | 31.5 | 39.375 | 43.75 | 48.125 | 52.5 | 57.75 | 63 |
| 200 | 7 | 7 | 10.5 | 14 | 17.5 | 21 | 23.625 | 26.25 | 33.25 | 38.5 | 43.75 | 49 | 52.5 | 56 | 59.5 | 63 |
| 220 | 7 | 7 | 10.5 | 14 | 17.5 | 21 | 23.625 | 26.25 | 33.25 | 38.5 | 43.75 | 49 | 52.5 | 56 | 59.5 | 63 |
| 240 | 7 | 7 | 10.5 | 14 | 17.5 | 21 | 23.625 | 26.25 | 33.25 | 38.5 | 43.75 | 49 | 52.5 | 56 | 59.5 | 63 |
| 260 | 7 | 7 | 10.5 | 14 | 17.5 | 21 | 23.625 | 26.25 | 33.25 | 38.5 | 43.75 | 49 | 52.5 | 56 | 59.5 | 63 |
| 310 | 7 | 7 | 10.5 | 14 | 17.5 | 21 | 23.625 | 26.25 | 33.25 | 38.5 | 43.75 | 49 | 52.5 | 56 | 59.5 | 63 |

Thus, as shown in FIG. 5, the pressure increase of the entire two-stage turbo system can be accelerated with respect to that of a single turbo.

As a result, as shown in FIG. 6, the trade-off of NOx-PM in the exhaust gas is improved and a target exhaust gas level is reached.

The target exhaust level can thus be reached by changing the opening degree of a variable vane (VGT) of a high-pressure stage turbocharger disposed in the first stage to that of the map of Table 2 in which the opening degree of a variable vane (VGT opening degree) is reduced with respect to that of the VGT base map shown in Table 1 and improving the rise of boost pressure.

However, the problem is that where the opening degree of the variable vane is reduced, fuel consumption is worsened, as shown in FIG. 7.

FIG. 7 shows fuel consumption results of a total test simulating the aforementioned JE05 mode. The total test includes not only a test in a transient state, but also a test in a state with gradual changes, that is, in a stationary state.

Where a map with reduced opening degree of variable vane of Table 2 is used in the test shown in FIG. 7, the opening degree in the turbo map is reduced more than necessary in the stationary state and the intake air is unnecessarily supplied and pressurized, thereby worsening fuel consumption. Further, even in the transient state, the opening degree in the turbo map is reduced more than necessary, thereby causing worsening of fuel consumption.

In this case, using a transient-stage map (Table 2) for bringing the NOx-PM performance in the transient test to a target value worsens fuel consumption, but this effect is stronger in the stationary state than in the transient state.

As described above, a problem of worsened fuel consumption arises when only the decrease in NOx-PM is taken into account and the opening degree of variable vane is constantly reduced in the transient and stationary states in a transient mode.

Accordingly, it is an object of the present invention to resolve the above-described problems and provide a control device for multi-stage turbochargers that can improve fuel consumption in the transient and stationary states of an engine equipped with multi-stage turbochargers.

In order to attain the above-described object, the present invention provides a control device for multi-stage turbochargers which are turbochargers of at least two or more stages provided in series at an engine and in which a high-pressure stage turbocharger is configured by a variable-capacity turbocharger equipped with a variable vane, comprising: detection means for detecting a boost pressure or an intake air amount of a turbocharger of a stage with a pressure lower than that of the variable-capacity turbocharger, wherein an opening degree of the variable vane is controlled on the basis of a detection value of the detection means.

It is preferred that the control device comprise storage means for storing a stationary-state opening degree map in which the opening degree of the variable vane in a stationary state of the engine is recorded and a transient-state opening degree map in which the opening degree is set lower than that in the stationary-state opening degree map, wherein in the stationary state of the engine, the opening degree of the variable vane is controlled based on the stationary-state opening degree map, and in the transient state of the engine, when the detection value of the detection means exceeds a predetermined value, the opening degree of the variable vane is controlled based on the stationary-state opening degree map, and when the detection value is equal to or lower than the predetermined value, the opening degree of the variable vane is controlled based on the transient-state opening degree map.

In order to attain the above-described object, the present invention provides a control device for multi-stage turbochargers which are turbochargers of at least two or more stages provided in series at an engine and in which a high-pressure stage turbocharger is configured by a variable-capacity turbocharger equipped with a variable vane and an opening degree of the variable vane is reduced with respect to an opening degree in a stationary state when the engine revolution speed is increased, comprising: detection means for detecting a boost pressure or an intake air amount of a turbocharger of a stage with a pressure lower than that of the variable-capacity turbocharger; and prohibition means for prohibiting a reduction of the opening degree of the variable vane when a detection value of the detection means exceeds a predetermined value even when the engine revolution speed is increased.

The present invention demonstrates an excellent effect of enabling the improvement of fuel consumption in transient and stationary states of an engine equipped with multi-stage turbochargers.

EXPLANATION OF REFERENCE NUMERALS

1 ECU (control device for multi-stage turbochargers, prohibition means)
2 engine
6 high-pressure stage turbocharger (variable-capacity turbocharger)
7 low-pressure stage turbocharger
11 maf sensor (detection means for detecting intake air amount)
12 boost sensor (detection means for detecting boost pressure)
14 storage means
64 variable vane

BEST MODE FOR CARRYING OUT THE INVENTION

A preferred embodiment of the present invention will be described below with reference to the appended drawings.

A control device for multi-stage turbochargers of the present embodiment is designed, for example, for a two-stage turbo system mounted on a diesel engine (referred to hereinbelow as "engine") of a vehicle.

A schematic structure of the engine will be described based on FIG. 1.

Figure 1:
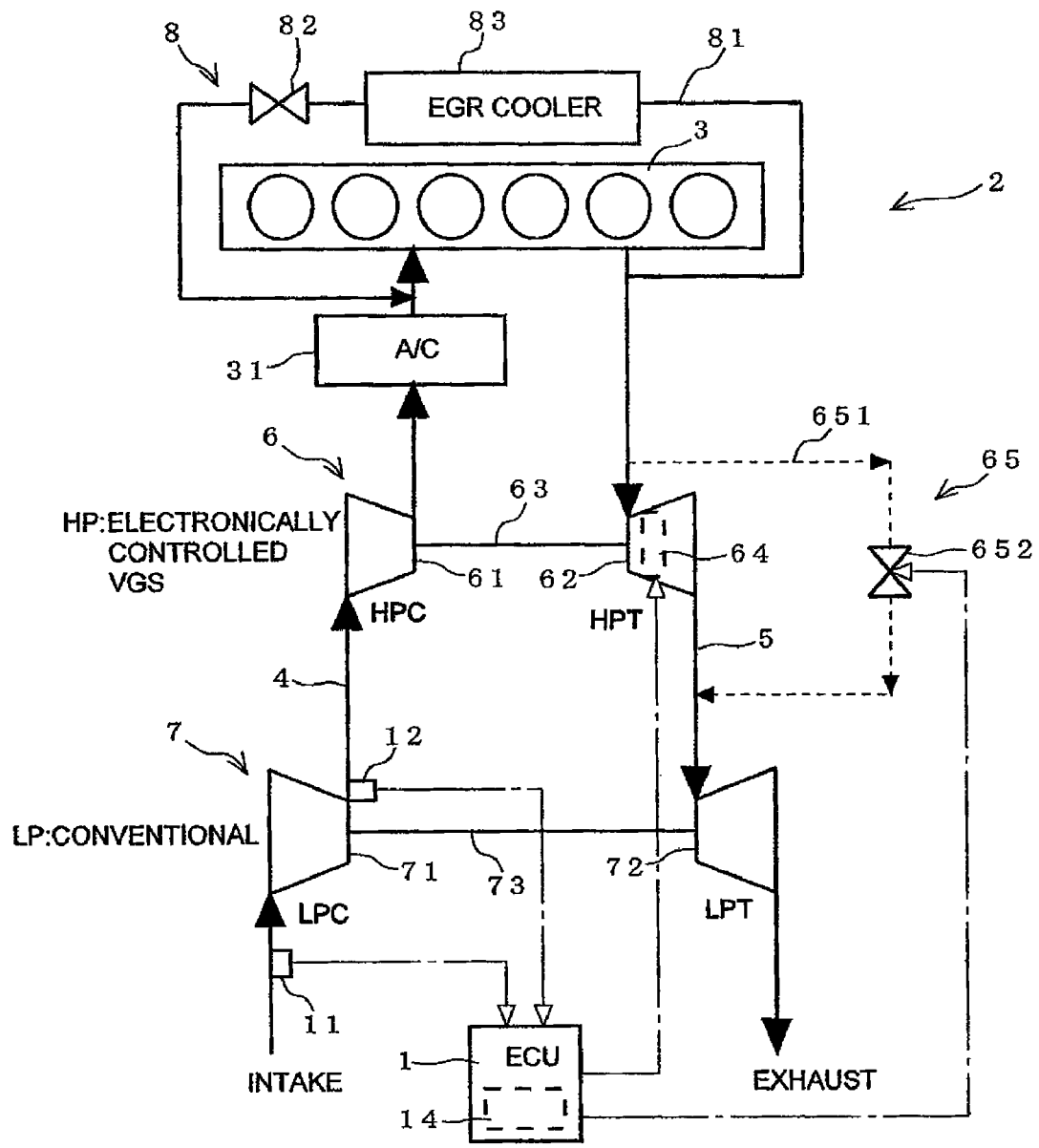
FIG. 1 is a schematic diagram of a control device for multi-stage turbochargers of an embodiment of the present invention and an engine.

As shown in FIG. 1, an engine 2 includes an engine body 3 having a plurality of cylinders, an intake passage 4 and an exhaust passage 5 connected to the engine body 3, turbochargers 6, 7 provided in the intake passage 4 and the exhaust passage 5 and serving to supply supercharged air to the engine body 3, an EGR device 8 for returning part of exhaust gas of the exhaust passage 5 to the intake passage 4, and an engine control unit (referred to hereinbelow as ECU) 1 for controlling the engine body 3.

In the present embodiment, the high-pressure stage turbocharger (HP) 6 and the low-pressure stage turbocharger (LP) 7 are provided in series and configure a two-stage system.

A maf sensor 11, a compressor (LPC, referred to hereinbelow as low-pressure stage compressor) 71 of the low-pressure stage turbocharger 7, a boost sensor 12, a compressor (HPC, referred to hereinbelow as high-pressure stage compressor) 61 of the high-pressure stage turbocharger 6, and an air cooler (A/C) 31 are provided in the order of description from the upstream side in the intake passage 4. A downstream end of the intake passage 4 is connected to an air intake manifold (not shown in the figure) of the engine body 3.

An upstream end of the exhaust passage 5 is connected to an exhaust manifold (not shown in the figure) of the engine body 3. A turbine (HPT, referred to hereinbelow as high-pressure stage turbine) 62 of the high-pressure stage turbocharger 6 and a turbine (LPT, referred to hereinbelow as low-pressure stage turbine) 72 of the low-pressure stage turbocharger 7 are provided in the order of description from the upstream side in the exhaust passage 5.

The low-pressure stage turbocharger 7 includes the above-described low-pressure stage compressor 71 and low-pressure stage turbine 72 and a turbine shaft 73 that couples the low-pressure stage compressor 71 and the low-pressure stage turbine 72. The low-pressure stage compressor 71 is driven by the low-pressure stage turbine 72 and pressurizes the intake air.

The maf sensor 11 disposed upstream of the low-pressure stage compressor 71 is detection means for detecting an intake air amount (mass flow rate) taken in the low-pressure stage compressor 71, and the boost sensor 12 attached to a discharge port of the low-pressure stage compressor 71 is detection means for detecting a boost pressure of the low-pressure stage compressor 71.

The high-pressure stage turbocharger 6 includes the above-described high-pressure stage compressor 61 and high-pressure stage turbine 62 and a turbine shaft 63 that couples the high-pressure stage compressor 61 and the high-pressure stage turbine 62. The high-pressure stage compressor 61 is driven by the high-pressure stage turbine 62, further pressurizes the supercharged air pressurized in the low-pressure stage compressor 71, and supplies it to the engine body 3.

In the present embodiment, the high-pressure stage turbocharger 6 is configured by a variable-capacity turbocharger (in the figure, electronically controlled VGS) equipped with a variable vane 64.

More specifically, the high-pressure stage turbine 62 is provided with the variable vane 64 for changing the turbine capacity, and the high-pressure stage turbine 62 is so configured that where an opening degree of the variable vane 64 is reduced, the turbine capacity is decreased.

A wastegate unit 65 for bypassing the high-pressure stage turbine 62 is provided in the high-pressure stage turbocharger 6. The wastegate unit 65 includes a wastegate passage 651 for linking an upstream side (intake side) and a downstream side (discharge side) of the high-pressure stage turbine 62 and a wastegate valve 652 provided in the wastegate passage 651.

The EGR device 8 includes an EGR passage 81 for linking the exhaust passage 5 and the intake passage 4, an EGR valve 82 provided in the EGR passage 81, and an EGR cooler 83 that is disposed upstream of the EGR valve 82 and serves for cooling a gas (EGR gas) flowing in the EGR passage 81. The upstream end of the EGR passage 81 is connected to the exhaust passage 5 between the engine body 3 and the high-pressure side turbine, and the downstream end is connected to the intake passage 4 between the engine body 3 and air cooler 31.

The ECU 1 of the present embodiment is a control unit of the multi-stage turbocharger 6 and controls an opening degree of the variable vane 64 of the high-pressure stage turbine 62 on the basis of a detection value (intake air amount of the low-pressure stage turbine 72) of the maf sensor or a detection value (boost pressure of the low-pressure stage turbine 72) of the boost sensor 12.

Various sensors such as the maf sensor 11 and the boost sensor 12 are connected to the ECU 1 and detection values of these sensors are inputted therein.

Further, the ECU 1 is connected so as to supply control signals to various actuators such as the wastegate valve 652 and variable vane 64 of the high-pressure stage turbine 62.

The ECU 1 includes storage means 14 that stores a stationary-state opening degree map (see Table 1) in which an opening degree of the variable vane 64 in a stationary state of the engine 2 is set and a transient-state opening degree map (see Table 2) in which the opening degree is set lower than that in the stationary-state opening degree map. In the stationary state of the engine 2, an opening degree of the variable vane 64 is controlled based on the stationary-state opening degree map, and in the transient state of the engine 2, when the detection value of the detection means 11, 12 exceeds a predetermined value, an opening degree of the variable vane 64 is controlled based on the stationary-state opening degree map, and when the detection value is equal to or lower than the predetermined value, an opening degree of the variable vane 64 is controlled based on the transient-state opening degree map. This configuration and operation will be described below in greater detail.

Here, in the stationary-state opening degree map of Table 1 and the transient-state opening degree map of Table 2, an engine revolution speed (rpm) is plotted against the abscissa (first line), and a fuel flow rate (mm$^3$/sec) is plotted against the ordinate. Further, numerical values in the tables indicate an opening degree (%) of the variable vane 64, and the smaller is the numerical value is, the more closed (reduced) the variable vane 64.

Control performed by the control device for multi-stage turbochargers of the present embodiment will be descried below.

In a transient state, for example when the revolution speed of the engine 2 is increased, the ECU 1 of the present embodiment basically reduces the opening degree of the variable vane 64 of the high-pressure stage turbine 62 with respect to that in a stationary state so as to prevent a pressure increase lag of the low-pressure stage turbocharger 7.

The stationary state as referred to herein is a state with the smallest variations in engine operation state, for example, a state in which the vehicle travels at a constant speed (or a state in which the engine revolves at a constant rate), and the transient state is a state with the most severe variations in engine operation state, for example, a state in which the vehicle accelerates (or a state in which the engine revolution speed rises).

However, there is a concern that reducing the opening degree of the variable vane 64 of the high-pressure stage turbine 62 will cause deterioration of fuel consumption.

Accordingly, in the present embodiment, inhibition means is provided for inhibiting a reduction of the opening degree of the variable vane 64 when the detection value of the detection means 11, 12 exceeds a predetermined value even in a transient state, for example when the revolution speed of engine 2 is increased. In the present embodiment, ECU 1 constitutes the inhibition means.

More specifically, the ECU 1 of the present embodiment holds a transient-state opening degree map for a transient state and a stationary-state opening degree map for a stationary state as control maps of the variable vane 64 (VGT) of the high-pressure stage turbocharger 6 that is disposed in the first stage. The ECU 1 switches between the stationary-state opening degree map and the transient-state opening degree map of the variable vane 64 of the high-pressure stage turbocharger 6, which is disposed in the first stage, depending on a degree to which a boost pressure or intake air amount of the low-pressure stage turbocharger 7 disposed in the second stage has reached the target map, in order to improve the deterioration of fuel consumption in a transient state in the two-stage turbo system.

As a result, the unnecessary reduction in opening degree of the variable vane 64 in a transient state can be prevented and fuel consumption can be improved.

An example of control performed by the control device for multi-stage turbochargers of the present embodiment will be explained below based on FIG. 2.

Figure 2:
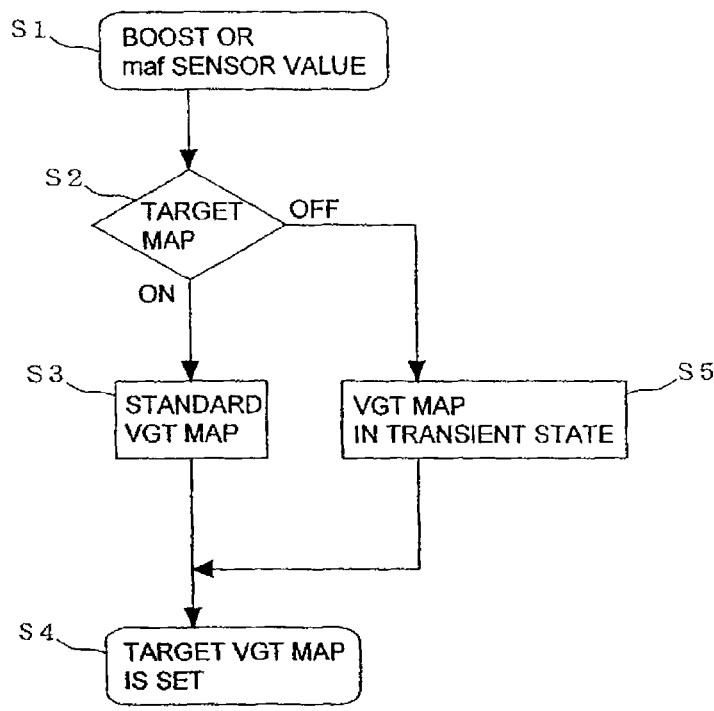
FIG. 2 is an operation system of the present embodiment.
Figure 3:
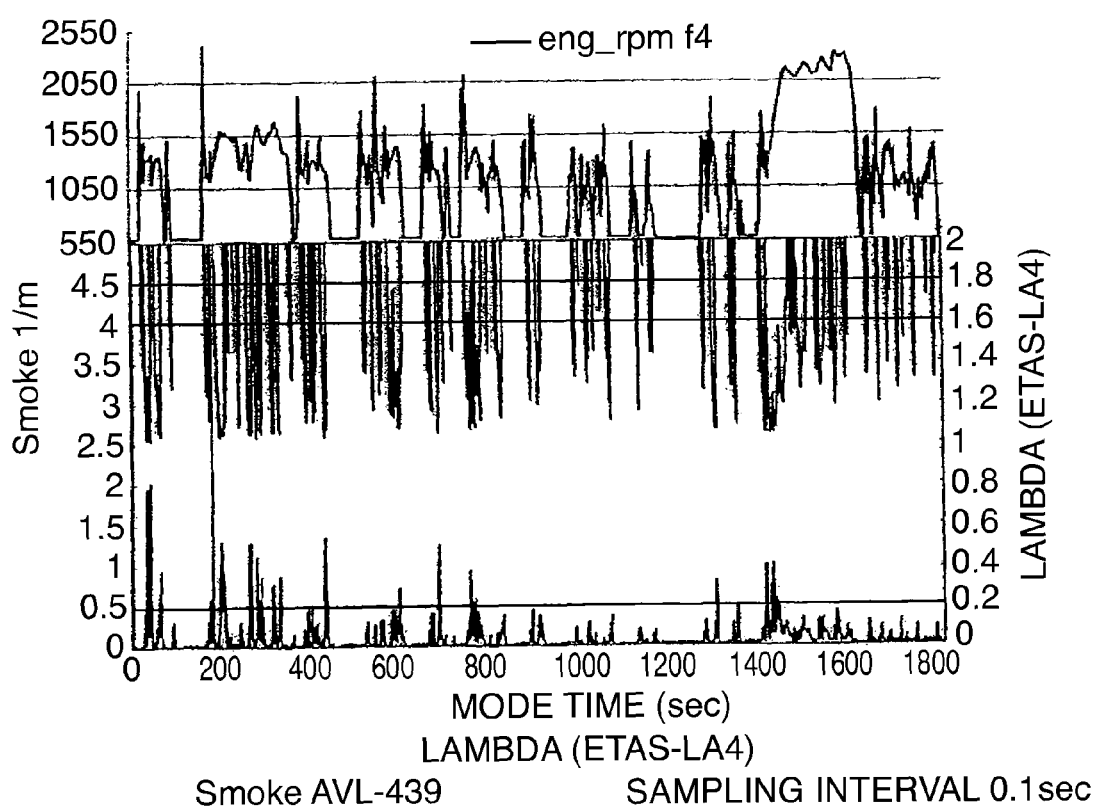
FIG. 3 shows test data of Japan JE05 mode.

The control illustrated by FIG. 2 is executed by the ECU 1, for example, when the revolution speed of engine 2 is increased. In a stationary state of engine 2, the ECU 1 controls the variable vane 64 on the basis of the stationary-state opening degree map.

In step S1, the ECU 1 acquires a boost pressure detected by the boost sensor 12 attached to an intake air outlet (discharge port) of the low-pressure stage compressor 71 disposed in the second stage.

In step S2, the ECU 1 determines whether the boost pressure (detection value) of the boost sensor 12 acquired in step S1 exceeds a predetermined target boost pressure (predetermined value).

More specifically, the ECU 1 reads the target boost pressure from the target map stored in the ECU 1 and compares this target boost pressure with a boost pressure detected by the boost sensor 12. For example, a target boost pressure for each operation state of the engine 2 (engine revolution speed or fuel injection amount) is recorded in the target map.

If it is determined in step S2 that the boost pressure exceeds the target boost pressure, the ECU 1 selects in step S3 the stationary-state opening degree map (standard VGT map in FIG. 2) in which the opening degree of the variable valve 64 in the stationary state of the engine is recorded and sets the selected map as the target VGT map in step S4.

On the other hand, if it is determined in step S2 that the boost pressure is equal to or lower than the target boost pressure, the ECU 1 selects in step S5 the transient-state opening degree map (transient-state VGT map in FIG. 2) in which the opening degree is set lower than in the stationary-state opening degree map and sets the selected map as the target VGT map in step S4.

In step S4, the stationary-state opening degree map or the transient-state opening degree map is set as the target VGT map and then the opening degree of the variable valve 64 is controlled by the ECU 1 on the basis of the target VGT map.

Thus, in the present embodiment, the stationary-state opening degree map or the transient-state opening degree map is selected correspondingly to the boost pressure (detection value of the boost sensor 12) of the low-pressure stage turbocharger 7 so as to determine the opening degree (VGT opening degree) of the variable vane 64 of the high-pressure stage turbocharger 6.

In other words, when the boost pressure of the low-pressure stage turbocharger 7 does not reach the target boost pressure in a transient state, the opening degree of the variable vane 64 of the high-pressure stage turbocharger 6 is controlled on the basis of the transient-stage opening degree map in which the opening degree is reduced for a transient state, and when the target boost is reached, the control is performed on the basis of the stationary-state opening degree map for a stationary state even in the transient state.

As a result, in the present embodiment, it is possible to improve fuel consumption in a transient state of the engine 2 provided with the multi-stage turbochargers 6.

Figure 7:
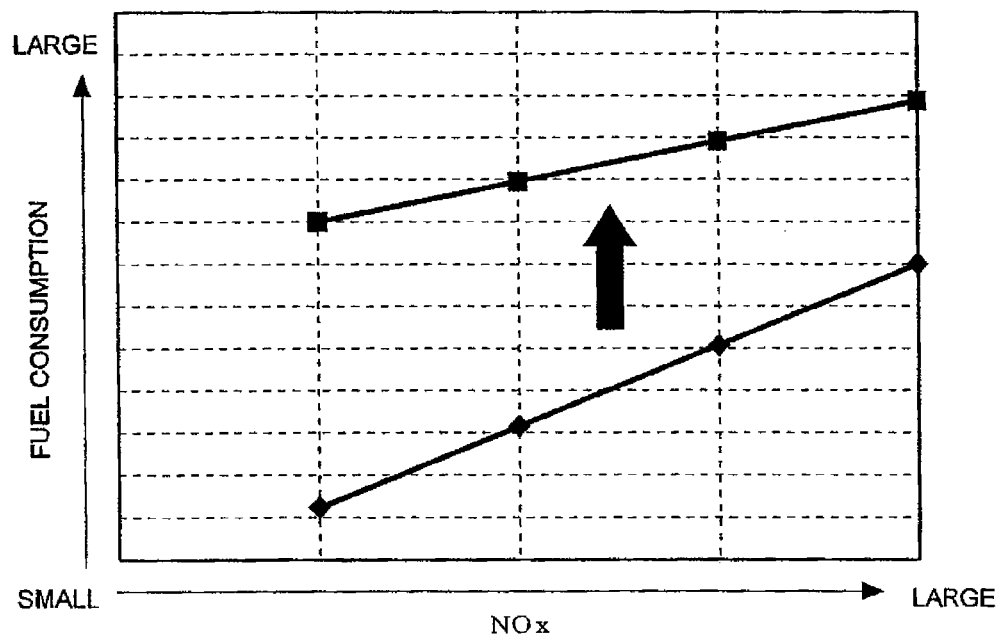
FIG. 7 serves to explain how a VGT opening degree map variation worsens fuel consumption.

Thus, because the transient-state opening degree map shown in the table has been conventionally used at all times in the transient state, the opening degree of the variable vane 64 has been reduced more than necessary, thereby causing worsening of fuel consumption as shown in FIG. 7.

By contrast, the effect obtained in the present embodiment is that by appropriately selecting an effective turbo VGT map on the basis of boost pressure of the low-pressure stage compressor 71, it is possible to avoid the unnecessary reduction in the opening degree of the variable vane 64 and improve fuel consumption in a two-stage turbo system.

Figure 4:
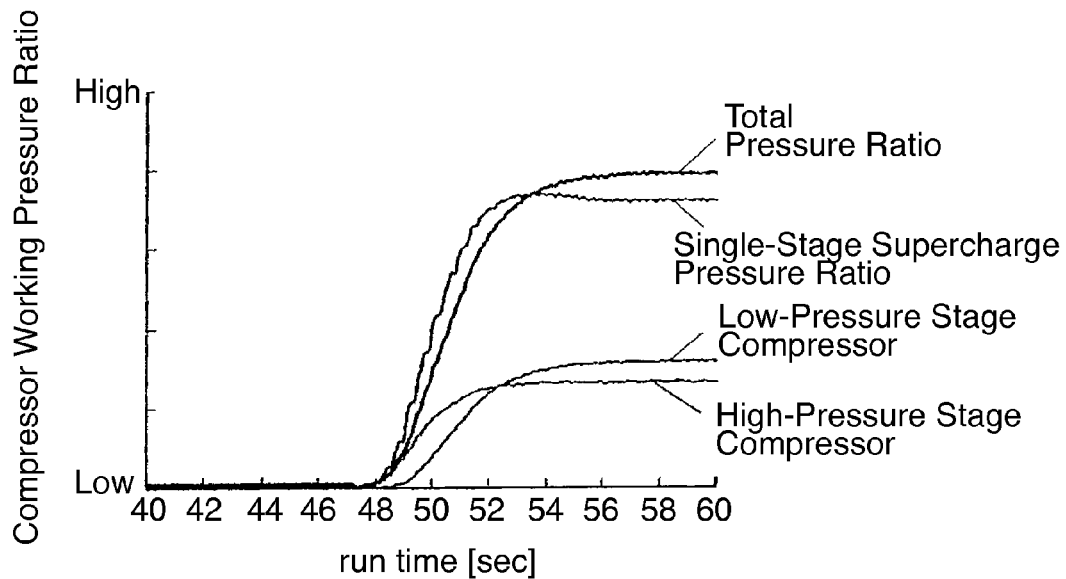
FIG. 4 serves to explain the comparison of turbo pressure ratio increase in a transient state.
Figure 5:
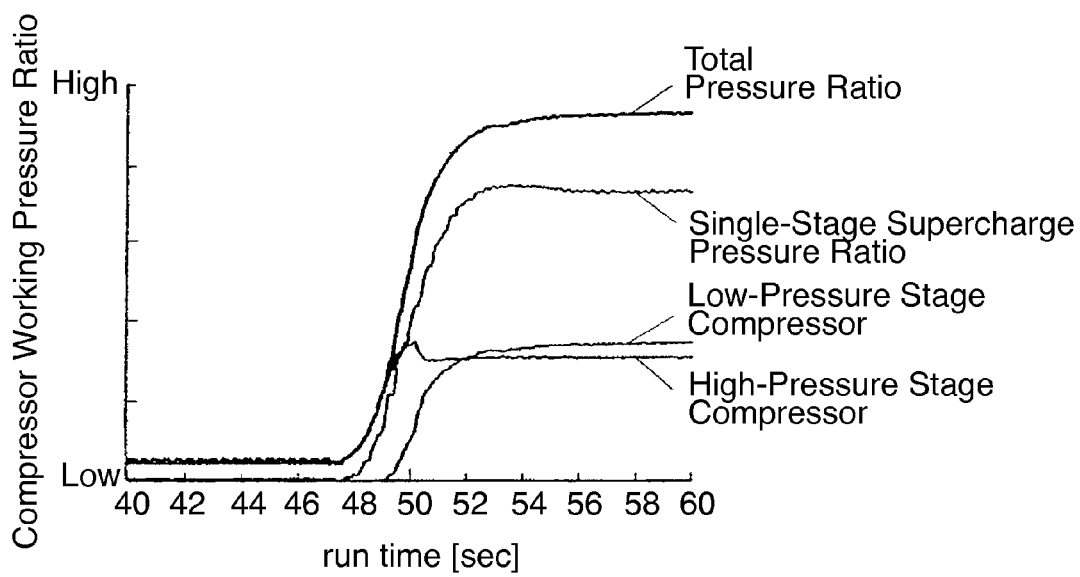
FIG. 5 serves to explain the comparison of turbo pressure ratio increase in a transient state in which an opening degree of high-pressure stage turbo VGT has been reduced.
Figure 6:
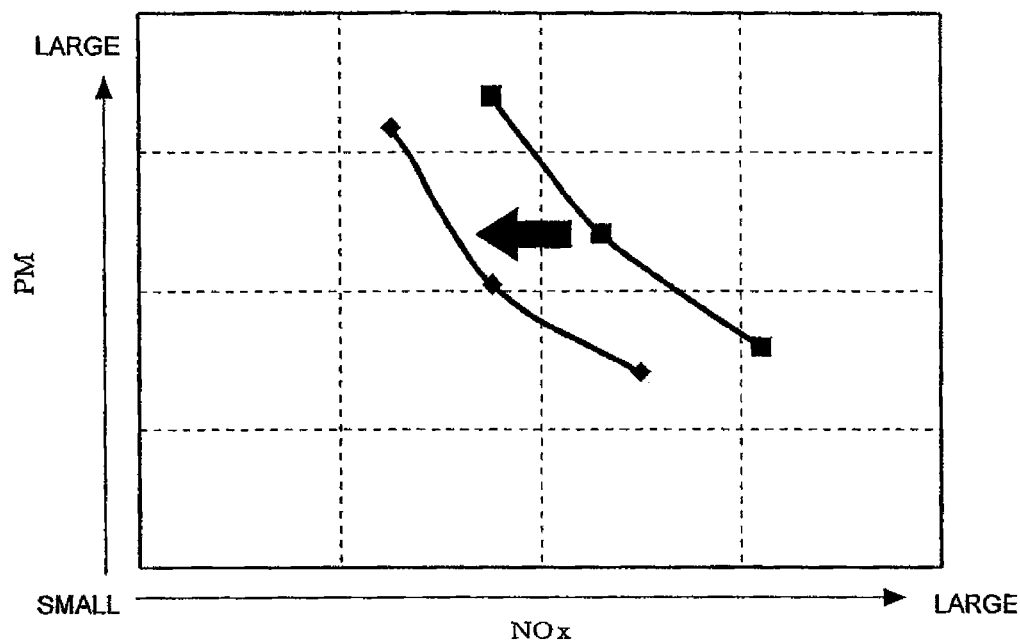
FIG. 6 serves to explain exhaust gas performance improvement results.

For example, when only the transient-state opening degree map is used, as in the conventional system, a total pressure ratio of the two-stage turbo system increases more than necessary and fuel consumption worsens, as shown at and after 56 sec in FIG. 5. By contrast, in the present embodiment, because switching is performed from the transient-state opening degree map to the stationary-state opening degree map on the basis of boost pressure, the excess increase in the total pressure ratio can be inhibited, as shown at and after 56 sec in FIG. 4. Further, in this case, the total pressure ratio exceeds the single-stage supercharged pressure ratio and the desirable performance requirements are satisfied.

Thus, in the present embodiment, in a transient state with severe variations, the VGT opening degree of the turbocharger 6 is actuated in a 48 to 52 sec state of FIG. 5 to respond to severe NOx-PM, and the VGT opening degree of the turbocharger 6 in a state with more gentle variations and a stationary state is actuated in a state at and after 56 sec of FIG. 4, thereby improving fuel consumption.

FIG. 4 and FIG. 5 show the results of simulation test performed to evaluate a portion of the aforementioned JE05 mode.

In this case, a typical control system using the boost sensor 12 or maf sensor 11 is employed, but the difference is that the control device of the present embodiment detects a boost pressure (turbo pressure) of the second stage (low-pressure stage) and determines the VGT opening degree of the turbocharger 6 disposed in the first stage (high-pressure stage) to solve the problem of a pressure increase lag in the turbocharger 7 disposed in the second stage (low-pressure stage), which is a unique problem of two-stage turbo systems.

The present invention is not limited to the above-described embodiment and a variety of modification examples or application examples can be considered.

For example, a detection value of the boost sensor 12 is used, but this is not limiting, and a detection value of the maf sensor 11 may be also used. Thus, when the intake air amount detected by the maf sensor 11 exceeds the predetermined target intake air amount in a transient state of the engine 2, the ECU 1 may control the opening degree of the variable valve 64 on the basis of the stationary-state opening degree map, and when the detected intake air amount is equal to or lower than the target air intake amount, the opening degree of the variable valve 64 may be controlled based on the transient-state opening degree map.

Further, in the above-described embodiment, the control device in accordance with the present invention is applied to a two-stage system, but the structure of the control device is not limited to that shown in FIG. 1 and can be applied to all the systems using two turbochargers per engine and also to turbo systems in which three or more turbochargers are disposed in series.

The invention claimed is:

1. A control device for multi-stage turbochargers which are turbochargers of at least two or more stages provided in series at an engine and in which a high-pressure stage turbocharger is configured by a variable-capacity turbocharger equipped with a variable vane, comprising:

detection means for detecting a boost pressure or an intake air amount of a turbocharger of a stage with a pressure lower than that of the variable-capacity turbocharger, wherein an opening degree of the variable vane is controlled on the basis of a detection value of the detection means;

storage means for storing a stationary-state opening degree map in which the opening degree of the variable vane in a stationary state of the engine is recorded and a transient-state opening degree map in which the opening degree is set lower than that in the stationary-state opening degree map;

wherein in the stationary state of the engine, the opening degree of the variable vane is controlled based on the stationary-state opening degree map, and in the transient state of the engine, when the detection value of the detection means exceeds a predetermined value, the opening degree of the variable vane is controlled based on the stationary-state opening degree map, and when the detection value is equal to or lower than the predetermined value, the opening degree of the variable vane is controlled based on the transient-state opening degree map.

* * * * *